(12) United States Patent
Ensinger

(10) Patent No.: US 8,110,942 B2
(45) Date of Patent: Feb. 7, 2012

(54) STANDBY SAVER

(75) Inventor: Peter John Ensinger, Derbyshire (GB)

(73) Assignee: Timothy James Lindley, Nottinghamshire (GB)

( * ) Notice: Subject to any disclaimer, the term of this patent is extended or adjusted under 35 U.S.C. 154(b) by 0 days.

(21) Appl. No.: 12/442,632

(22) PCT Filed: Sep. 25, 2007

(86) PCT No.: PCT/EP2007/008327
§ 371 (c)(1),
(2), (4) Date: Nov. 11, 2009

(87) PCT Pub. No.: WO2008/037428
PCT Pub. Date: Apr. 3, 2008

(65) Prior Publication Data
US 2010/0207462 A1    Aug. 19, 2010

(30) Foreign Application Priority Data

Sep. 25, 2006  (GB) ................................. 0618840.3

(51) Int. Cl.
*H02J 3/14* (2006.01)
(52) U.S. Cl. .......................................... 307/31; 307/139
(58) Field of Classification Search ............... 307/38, 307/39, 40, 116, 117, 125, 31, 139, 140, 307/29; 439/652; 700/286, 295
See application file for complete search history.

(56) References Cited

U.S. PATENT DOCUMENTS

| | | | |
|---|---|---|---|
| 5,939,803 A * | 8/1999 | Frost | 307/126 |
| 6,476,523 B1 * | 11/2002 | Lee | 307/141 |
| 6,509,655 B1 * | 1/2003 | Wang | 307/31 |
| 6,870,463 B2 * | 3/2005 | Dresti et al. | 340/10.4 |
| 2001/0014027 A1 * | 8/2001 | Mori et al. | 363/21.07 |
| 2003/0151909 A1 * | 8/2003 | Sid | 362/85 |
| 2005/0073429 A1 | 4/2005 | Singh | |
| 2005/0179558 A1 * | 8/2005 | Williams et al. | 340/825.69 |
| 2006/0208573 A1 | 9/2006 | Hoopes | |
| 2007/0038334 A1 * | 2/2007 | Chou et al. | 700/292 |
| 2007/0115695 A1 * | 5/2007 | Lou et al. | 363/16 |
| 2007/0262646 A1 * | 11/2007 | Lee | 307/39 |

FOREIGN PATENT DOCUMENTS

| | | |
|---|---|---|
| DE | 19902306 C1 | 2/2000 |
| EP | 1020983 A2 | 7/2000 |
| EP | 1653572 A1 * | 5/2006 |
| GB | 2385449 B | 2/2004 |
| WO | WO 95/10875 | 4/1995 |
| WO | WO 2006/106310 A2 | 10/2006 |

OTHER PUBLICATIONS

International Search Report: Application No. PCT/EP2007/008327, ISA/European Patent Office, Feb. 29, 2008.

* cited by examiner

*Primary Examiner* — Jared Fureman
*Assistant Examiner* — Daniel Cavallari
(74) *Attorney, Agent, or Firm* — Meschkow & Gresham, P.L.C.

(57) ABSTRACT

A remote-controlled mains power switch is provided, which is suitable for supplying mains-powered equipment such as TVs or personal computers with electricity. The switch comprises mains power input, an electricity storage device, a control circuit and a sensor for receiving signals from remote controlling equipment, which is ordinarily supplied with the mains-powered equipment. In use, the electricity storage device is charged by the mains power whilst the mains-powered equipment is in use, the control circuit is powered by the electricity storage device and is operative to selectively switch the mains power supply on or off in response to signals received from controlling equipment.

11 Claims, 6 Drawing Sheets

STANDBY SAVER

FIELD OF THE INVENTION

The standby saver is a device that allows the electricity supply to a television set or other electronic equipment to be disconnected and reconnected using the standby instruction from the remote control supplied by the electronic equipment's manufacturer.

BACKGROUND TO THE INVENTION

There are many remote-controlled power sockets already in use but these all have their own remote control handset supplied with them, and still require power from the mains supply when the connected equipment is not being used. This means that there will be no advantage in using these in order to switch off the mains power supply to equipment that is in standby. Another disadvantage is that the user must use the remote control handset provided with the remote-controlled power socket in order to switch the mains power supply on, then use the remote control handset supplied with the connected equipment in order to switch on the equipment.

OBJECT OF THE INVENTION

An object of the invention is to provide means to reduce the energy consumption of domestic electronic equipment to zero power, during the time in which this equipment is in the standby mode and not in use, without however losing the convenience of the standby function of the equipment.

SUMMARY OF THE INVENTION

According to the present invention, a remotely-controlled mains power switch is provided, which may be incorporated in electrical and/or electronic equipment, or may be implemented as a standalone unit, which is powered by an electricity storage device whilst the switch is switched off and awaits a signal from controlling equipment to switch on, and wherein the electricity storage device is charged whilst the switch is in the on state.

The remote-controlled switch is powered by the electricity storage device, which is charged whilst equipment connected to the remote-controlled switch is in use. This electricity storage device provides power to a control circuit in the switch whilst the equipment is in the standby mode. The switching is controlled by the standby/on command from the remote control handset supplied with the equipment. An advantage of the switch is therefore an overall reduction of the energy consumed by the electrical equipment, which benefits both the environment and the equipment user's energy costs.

In a preferred embodiment, the switch may be incorporated into the controlled equipment, for instance in the control system of the host equipment, such as a television receiving set or any other similar, energy-powered apparatus.

In an alternative embodiment, the switch may be a standalone unit, which is fitted with multiple outlet sockets for the connection of external equipment. For instance, the unit may take the form of a small rectangular box having a number of power sockets, for instance located on the front of the unit, and a flexible cable, for instance emerging from one of the shorter sides, terminated with a standard mains power plug, wherein the power plug is connected at one end to a mains supply and, at the other end and via the cable, to the power sockets and the electricity storage device.

A socket may be mounted on the side of the unit to allow the connection of an infrared receiver and/or a computer connecting cable, supplied with the switch. The infrared receiver may have a self-adhesive base and be connected to a cable terminated with a plug to be inserted in the socket, in order to allow the receiver to be fixed to the connected equipment or within the vicinity of the equipment, such that remote control signals may be received by the receiver and carried to the unit through the cable, plug and socket arrangement.

The switch may also comprise two buttons and a LED indicator, to be used by a user at the time of initially setting up the switch, in order to facilitate the programming the unit for receiving the commands from chosen remote controllers. These buttons and LED indicator can be built as part of the equipment in which the switch is incorporated. This arrangement may enable the switch to be either incorporated into new equipment, or built as a separate unit for use with existing equipment.

The switch or unit may be fitted with a memory capable of learning the commands of multiple remote controllers of existing equipment that will be connected to the outlets of this switch or unit. The unit may comprise a remote infrared sensor built as part of the host equipment or mounted at the end of a cable joining the sensor to the main unit. The infrared sensor may comprise a self adhesive pad on the back to enable the sensor to be fitted in such a way that the sensor may receive the infrared signals from the remote control handset while this is pointed at the host equipment. An advantage of this embodiment is that any mains powered equipment which is adapted to function with remote controlling means, can be retrofitted with the power-saving standby function of the switch according to the present invention.

DETAILED DESCRIPTION OF THE DRAWINGS

Figure 1:
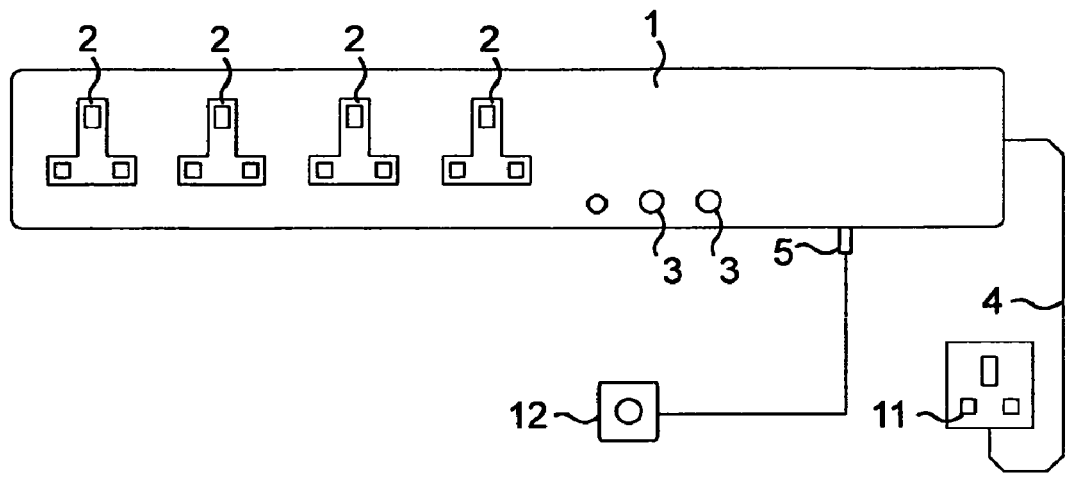
FIG. 1 shows a perspective view of an embodiment of the remote-controlled mains power switch incorporating a sensor.

With reference to FIGS. 1 to 7, an embodiment of the remote-controlled switch according to the present invention is shown, which comprises a rectangular box 1 configured with four mains power sockets 2, of the 3-pin type such as currently used in the United Kingdom. The mains power sockets are located on the front of the box and the switch has a mains flex cable 4 emerging from one of the shorter sides of the box, and terminated in a mains power plug 11, in the example a 13 Amp 3-pin type such as currently used in the United Kingdom, for connecting the switch to a household mains power socket 6.

Two small push buttons 3 are fitted to one of the longer sides, which are used for the initial setting up of the unit, as further described hereinbelow. A LED indicator and a 3.5 mm jack socket 5 are located next to the two push buttons, for connecting an infrared sensor 12 to the unit. The LED indicator is preferably adapted to provide illumination in several colours, in order to provide status messages to a user interacting with the switch in the manner of a user interface. The infrared sensor 12 is shown in further details in FIG. 5 and is mounted in a small box having a self-adhesive pad disposed on a surface thereof, and a lens on the front thereof for allowing the sensor to receive infrared signals from a remote control handset. In the example, the sensor includes a 2 meters cable terminated by a 3.5 mm jack plug 51, for connection to the corresponding 3.5 mm jack socket 5 of the switch.

Figure 7:
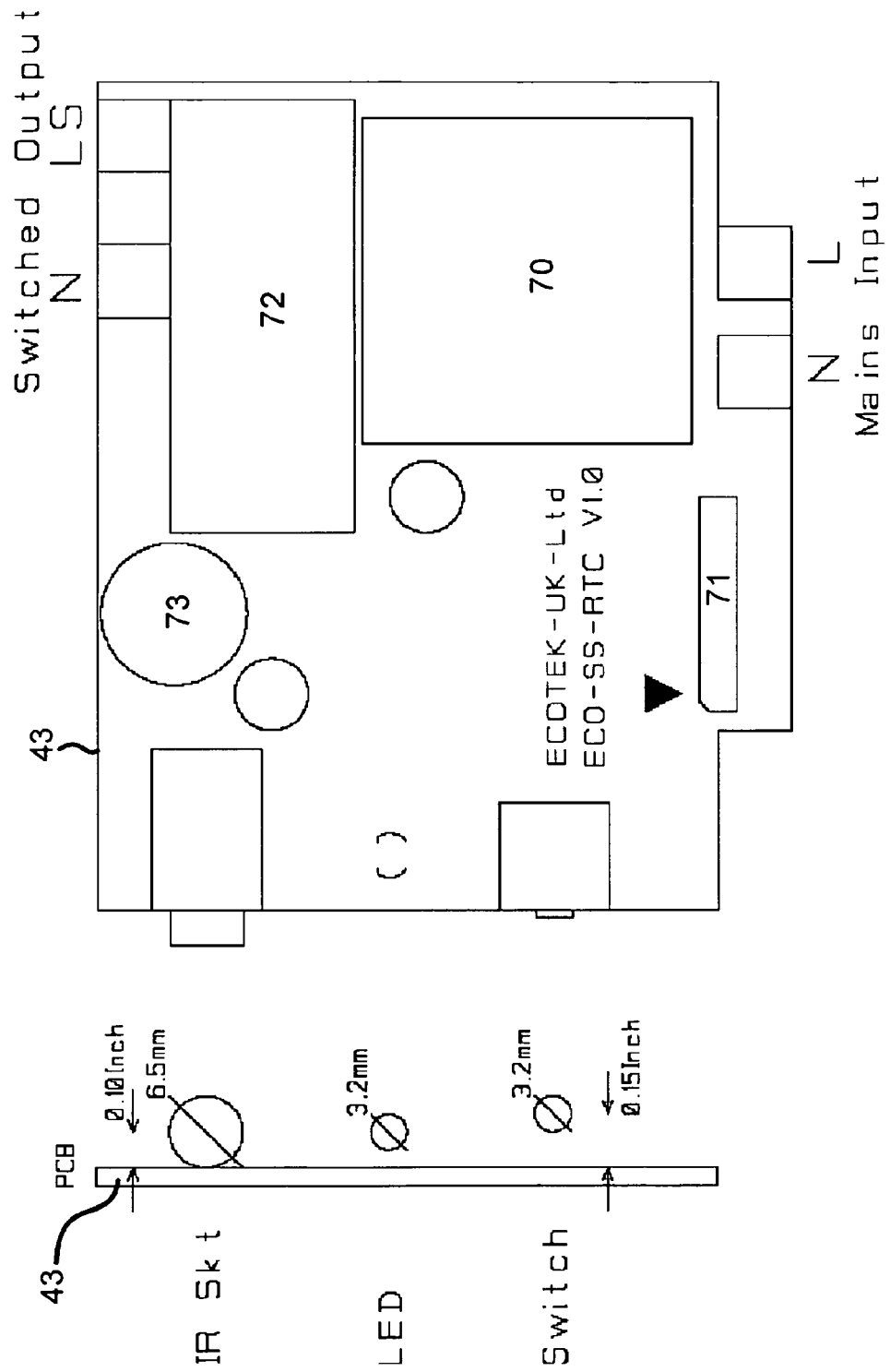
FIG. 7 shows a top view of the control circuit of FIG. 6.
Figure 8:
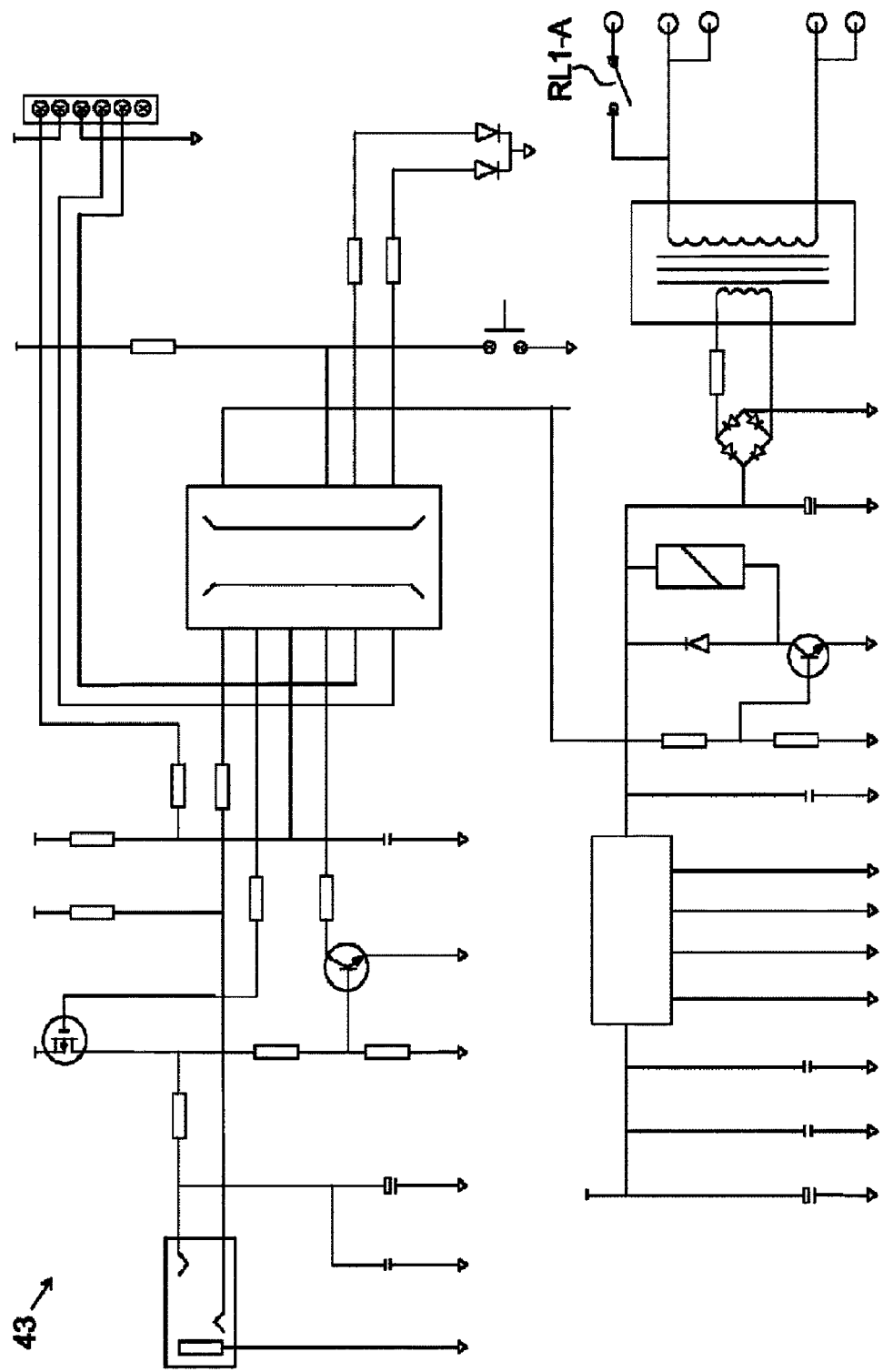
FIG. 8 represents a wiring diagram of the control circuit of FIGS. 6 and 7.

Inside the box 1 is an electronic circuit, a logic diagram of which is shown in FIG. 7, which includes a microcontroller 70, a memory 71, a PSU charger 72 and an electricity storage device 73, all of which are mounted on a PCB 43. An embodiment of PCB 43 is shown by way of example on FIG. 8. This circuit and the electricity storage device form a switching circuit, which is adapted to learn the on/off signals from remote controlling equipment supplied with mains powered equipment to be connected to any which one of the mains power sockets 2 of the switch 1. The switching circuit is also adapted to selectively switch the power supply on and off to the front-mounted sockets 2 and the power to the circuit, as well leaving the circuit to be powered by the electricity stored in the electricity storage device. The microcontroller and the infrared receiver 12 use a very small amount of power during the standby condition, enough so that the electricity storage device will supply enough power to keep the switch in the standby condition for about 6 months in-between operations. When the unit is operating to supply mains power, the PSU charger will fully charge the electricity storage device in about five hours.

Figure 2:
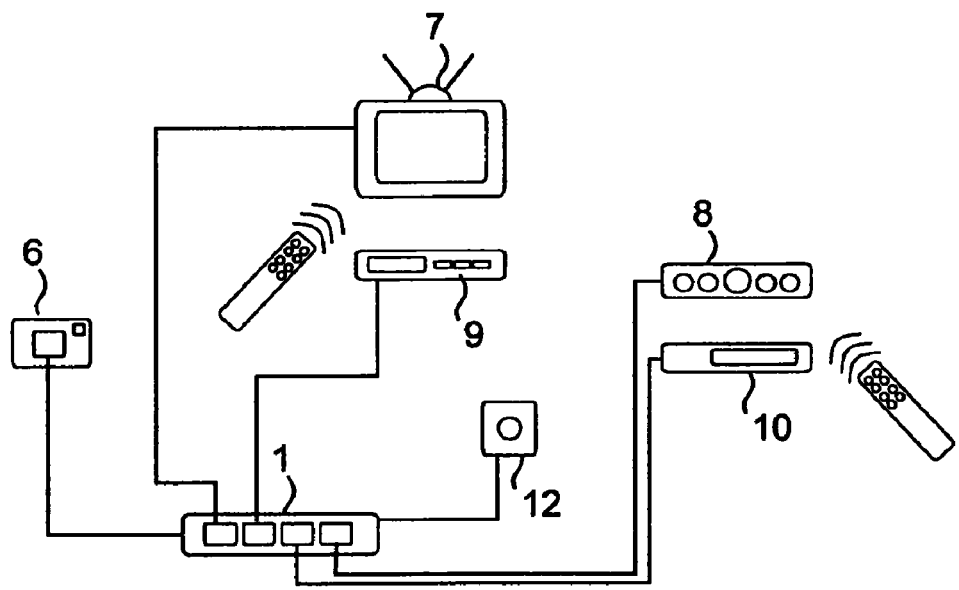
FIG. 2 illustrates the remote-controlled mains power switch of FIG. 1 in use.
Figure 3:
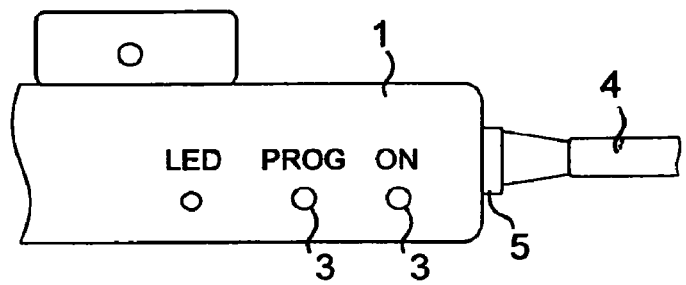
FIG. 3 shows a further embodiment of the remote-controlled mains power switch incorporating buttons and a LED indicator.
Figure 4:
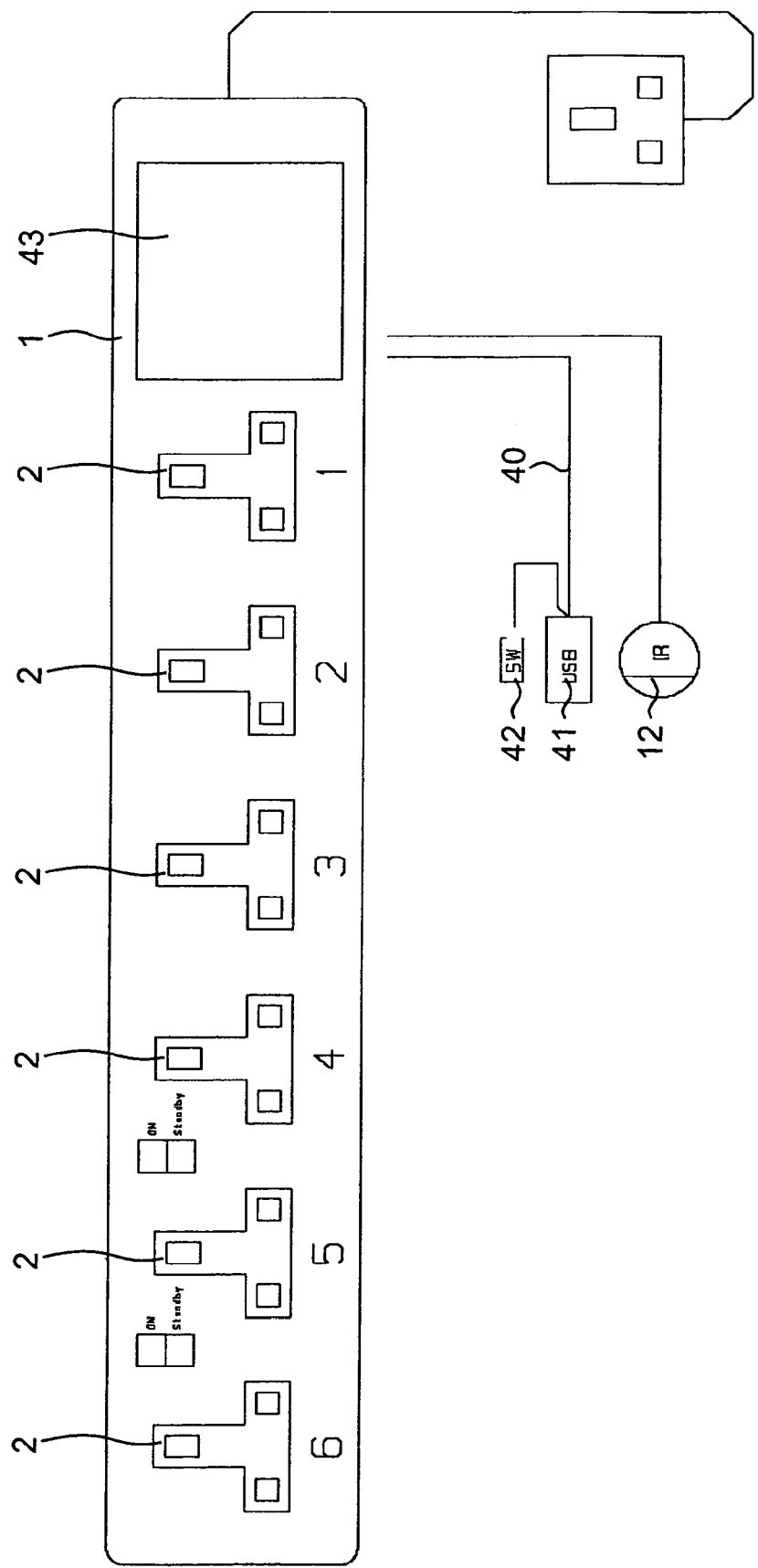
FIG. 4 represents a wiring diagram of the sensor of FIGS. 1 and 2 and a wiring diagram of a computer connecting cable.
Figure 5:
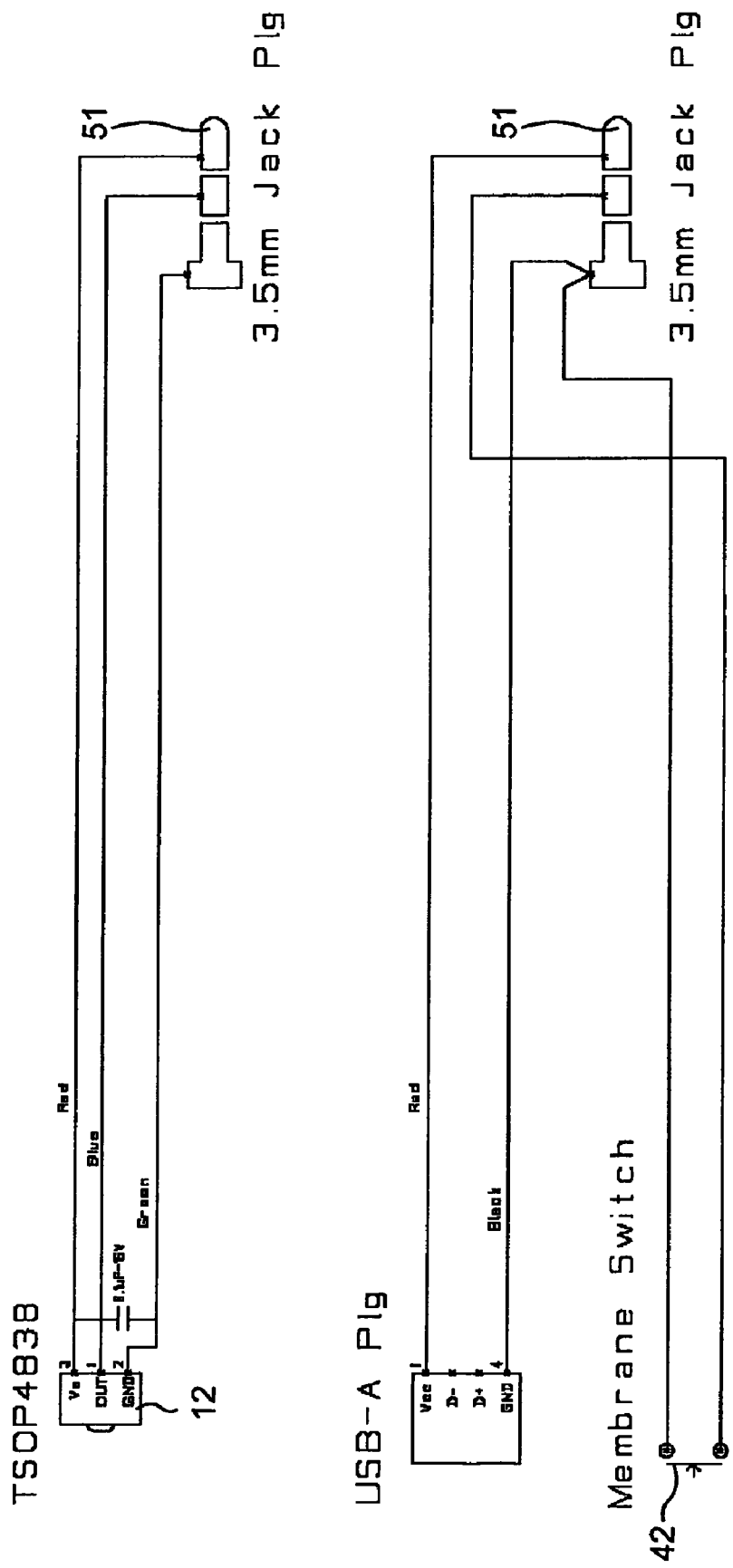
FIG. 5 shows a top view of the remote-controlled mains power switch of FIG. 1.
Figure 6:
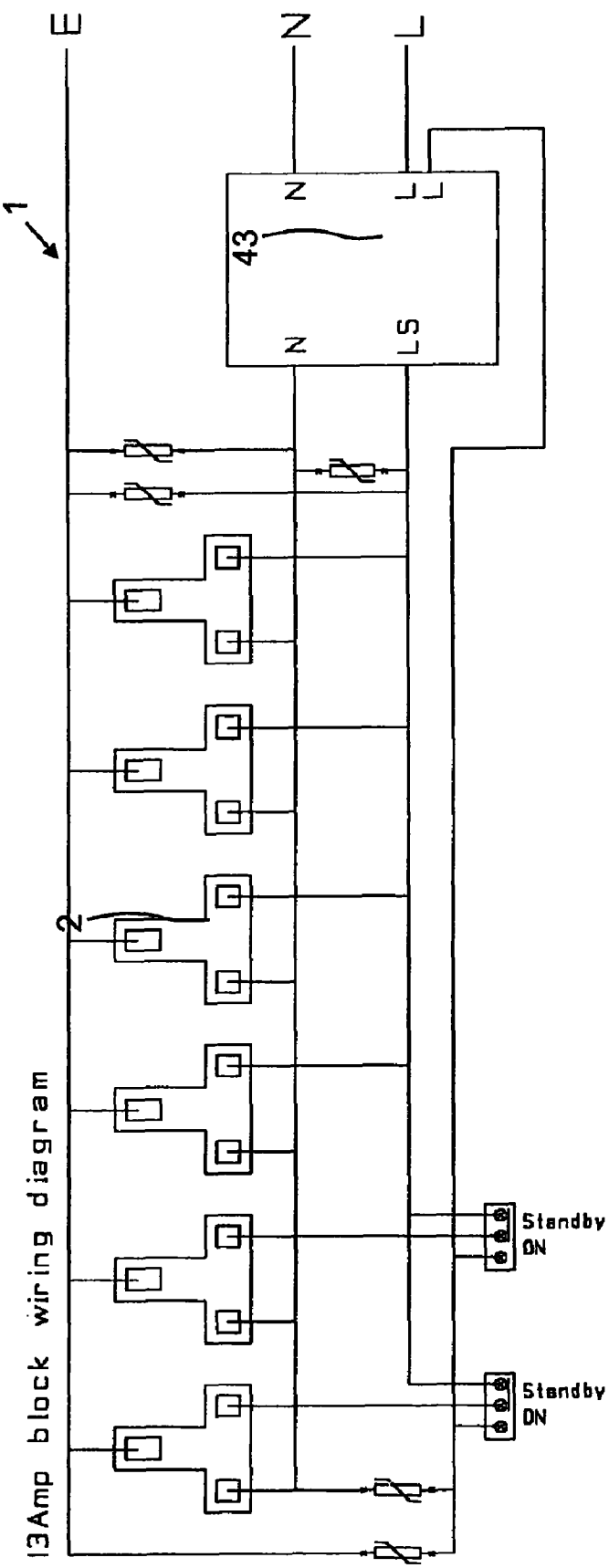
FIG. 6 represents a wiring diagram of the remote-controlled mains power switch of FIGS. 1 and 5, incorporating a control circuit.

FIG. 2 provides an illustration of the switch connected in use, between a mains power source 6 and mains powered equipment 7, 8, 9 and 10. In the example, remote control codes are programmed into the switch for the respective remote handsets of a TV 7 and an audio amplifier 8, since the DVD player 9 and the tuner 10 would not normally be used on their own. The memory of the switch may store up to ten remote codes for the mains powered equipment, but it will be readily understood by those skilled in the art, that this number is only illustrative and not to be construed as a limitation.

In operation, the switch 1 is connected to a mains outlet 6 and switched on with a button 3, whereby is the LED indicator is either lit or not, depending on an operating mode of the switch. The switch may operate in one of two modes, infrared mode and computer mode. In infrared mode, the switch may learn the button codes from an existing remote control and use these learnt codes to selectively switch mains power supply. In computer mode, the switch may be used with a computer interface, for instance a USB interface shown in further details in FIGS. 4 and 5, which includes a USB lead 40 connected to the sensor socket 5 on the switch 1. The lead 40 has a standard USB PC connector 41 and a flying self-adhesive membrane switch 42, and the USB PC connector 41 is preferably connected to any USB socket of the user's personal computer or similar apparatus (not shown).

In an embodiment of the present invention, if the status LED is not lit, then the switch is operating in IR mode. Otherwise, the status LED provides a steady illumination in a first colour, for instance orange, to indicate that it functions in USB mode. In order to change between modes, the user preferably switches off mains power, presses and holds a mode button 3 on the switch 1, then switches mains power back on whilst maintaining the mode button 3 held. After a predetermined period of time, typically of several seconds, the switch will change operating modes: from IR to USB or from USB to IR, with a corresponding change in the illumination of the status LED, whereby the mode button 3 may then be released. Preferably, the switch retains a currently-selected operating mode if it is subsequently switched off, until re-programmed as explained above.

If the switch is operating according to the USB mode, a particularly efficient use of the switch is to connect the user's personal computer and all other peripherals of the user's personal computer to the switch 1. As and when a user shuts down their personal computer PC, the switch is preferably adapted to switch off all mains power supply, including the mains power supply to the PC. This means that the user's personal computer however cannot now be turned on again by using the personal computer's normal power switch. The membrane switch 42 should preferably be affixed to a convenient position and subsequently pressed to temporarily re-instate power to the switch 1, causing the personal computer to reboot and sending the appropriate control signals through the USB connector 41 to the switch 1.

An alternative use of the switch in USB mode is to connect the peripherals of the user's personal computer to the switch 1 as above, with the exception of the personal computer itself, which is connected to a prior art mains supply. In this configuration, it is not necessary to use the membrane switch 42 to return mains power to the peripherals of the user's personal computer, because the personal computer can be switched back on using its normal power switch. In this configuration, however, the standby power of the PC is not being saved.

If the switch is operating according to the IR mode, the IR receiver 12 should be connected to the sensor connector on the switch 1 and should be positioned at a convenient location, typically on top of a television 7 set or any other connected appliance. Before normal operation, it is necessary for the switch 1 to learn the buttons from the remote controlling equipment provided by the manufacturer of the equipment, which will be connected to the switch for mains supply, i.e. the existing remote control of the TV 7, which remote controlling equipment will be used to operate the switch.

After powering the switch, programming may begin with pressing and holding the mode button 3 for a predetermined interval, typically of several seconds, whereby the LED on switch 1 will then display a second, alternative 'learning' colour, for instance red, to signify that the arrangement of the sensor 12, control circuit and memory are now awaiting the infrared signal corresponding to the button of the remote control which will be used to interrupt power supply to the switch 1. The user may then press a button of the equipment's remote control handset, for instance the 'power on' button of the TV remote control, whilst pointing the remote control handset at the IR receiver 12. The status LED may be adapted to provide an indication that the signal or signals, therefore command codes, are being received and memorised, for instance with a brief flickering of the illumination, and to then extinguish, at which time the user may then release the remote control button.

The switch may preferably be configured to ask the user for a verification of the received and memorised command code(s), by way of the status LED. For instance, the LED illumination may revert to the 'learning' colour, prompting the user to again point the remote control handset at the sensor 12 and press the same button thereon, then LED will again flicker and then extinguish, at which time the user may then again release the remote control button, the command code of which has been verified.

After a predetermined interval, typically of several seconds, programming may then continue the LED on switch 1 displaying a third, alternative 'learning' colour, for instance green, to signify that the arrangement of the sensor 12, control circuit and memory are now awaiting the infrared signal corresponding to the button of the remote control which will be used to start power supply to the switch 1. The user may then press a button of the equipment's remote control handset, for instance the 'power off' button of the TV remote control (or the same 'power on' button as previously, in case the same button is used on the handset for both functions), whilst pointing the remote control handset at the IR receiver 12. As previously described, the status LED may be adapted to provide an indication that the signal or signals, therefore command codes, are being received and memorised, for instance with a brief flickering of the illumination, and to then extinguish, at which time the user may then release the remote control button.

Further to the above procedure, in normal operation the switch 1 will interrupt power to all appliances 7, 8, 9, 10 that are connected to the switch 1 when the user presses the button on the equipment's remote control, the command code of which has been memorised.

In a further embodiment of the present invention, the switch 1 is adapted to be programmed, substantially in the manner as described above, for selectively interrupting power to an appliance 7, 8, 9, 10 which is respectively connected to each of the power outlets 2 of the switch 1, thus wherein power supply is interrupted only to a respective appliance when the user presses the button on that appliance's remote control, the command code of which has been memorised.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims; abstract and drawings), or to any novel one, or any novel combination, of the steps of any method or process so disclosed.

The words "comprises/comprising" and the words "having/including" when used herein with reference to the present invention are used to specify the presence of stated features, integers, steps or components but does not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A remote-controlled mains power switch suitable for supplying mains-powered equipment with electricity, the mains-powered equipment being supplied with remote controlling equipment, and the switch comprising:
   a mains power input configured for connection with a mains power source that is capable of supplying mains power,
   an electricity storage device,
   at least one mains power outlet, the mains-powered equipment being connectable to the at least one mains power outlet,
   a switching circuit including a memory and a sensor for receiving signals from the remote controlling equipment,
   wherein the electricity storage device is charged by the mains power whilst the mains-powered equipment is in use,
   the switching circuit is powered by the electricity storage device and is operative to selectively supply the mains power from the mains power source in response to the signals received from the remote controlling equipment,
   the memory stores commands of the remote controlling equipment, the commands including at least an on command and an off command for the mains-powered equipment, and
   the switching circuit supplies the mains power from the mains power source to the at least one mains power outlet when the received signals correspond to the on command stored in the memory, and the switching circuit discontinues the mains power at the at least one mains power outlet when the received signals correspond to the off command stored in the memory.

2. A remote-controlled mains power switch according to claim 1, wherein the mains-powered equipment includes a control system, and the switch is configured to be incorporated in the control system of the mains-powered equipment.

3. A remote-controlled mains power switch according to claim 1, wherein the switch further comprises a plurality of mains power outlets and the switching circuit is operative to selectively supply the mains power from the mains power source to the plurality of mains power outlets.

4. A remote-controlled mains power switch according to claim 3, wherein the switch is operative to selectively supply the mains power from the mains power source to each of the plurality of mains power outlets.

5. A remote-controlled mains power switch according to claim 1, further comprising a plurality of user-activated buttons and a LED indicator, for providing a user with an interface with which to facilitate the learning of remote controlling equipment commands in the memory.

6. A remote-controlled mains power switch according to claim 1, wherein the sensor is an infrared sensor.

7. A remote-controlled mains power switch according to claim 1, wherein the sensor is external to the switch and flexibly connected thereto in order to allow freedom of sensor location.

8. A remote-controlled mains power switch according to claim 1, wherein the mains-powered equipment includes a computer, the computer having a computer power supply, and the switch further comprises a computer connecting cable configured to be connected to the computer and adapted to interface the computer power supply with the switching circuit.

9. A remote-controlled mains power switch suitable for supplying mains-powered equipment with electricity, the mains-powered equipment being supplied with remote controlling equipment, the mains-powered equipment being a computer, and the switch comprising:
   a mains power input configured for connection with a mains power source that is capable of supplying mains power,
   an electricity storage device,
   a computer connecting cable,
   a switching circuit and a sensor for receiving signals from the remote controlling equipment,
   the electricity storage device is charged by the mains power whilst the mains-powered equipment is in use,
   the switching circuit is powered by the electricity storage device and is operative to selectively supply the mains power from the mains power source in response to the signals received from the remote controlling equipment, and
   the computer cable is configured to be connected to a computer and is adapted to interface a computer power supply of the computer with the switching circuit in order to selectively supply the mains power to the computer.

10. A remote-controlled mains power switch according to claim 9, wherein:
   the switch further comprises at least one mains powered outlet, the mains-powered equipment being connectable to the at least one mains power outlet,
   the switch further comprises a memory for storing commands of the remote controlling equipment respectively supplied with said mains-powered equipment, the commands including at least an on command and an off command for the mains-powered equipment, and
   the switching circuit supplies the mains power from the mains power source to the at least one mains power outlet when the received signals correspond to the on command stored in the memory, and the switching circuit discontinues the mains power at the at least one mains power outlet when the received signals correspond to the off command stored in the memory.

11. A remote-controlled mains power switch according to claim 10, further comprising a plurality of user-activated buttons and an indicator, for providing a user with an interface with which to facilitate the learning of remote controlling equipment commands in the memory.

* * * * *